United States Patent
Ohta et al.

(10) Patent No.: US 6,771,583 B2
(45) Date of Patent: Aug. 3, 2004

(54) OPTICAL COMPONENT

(75) Inventors: Tatsuo Ohta, Ohtsuki (JP); Takashi Nozaki, Tokyo (JP)

(73) Assignee: Konica Corporation, Tokyo (JP)

( * ) Notice: Subject to any disclaimer, the term of this patent is extended or adjusted under 35 U.S.C. 154(b) by 566 days.

(21) Appl. No.: 09/764,309

(22) Filed: Jan. 19, 2001

(65) Prior Publication Data

US 2002/0141322 A1 Oct. 3, 2002

(51) Int. Cl.⁷ .............................. G11B 7/00
(52) U.S. Cl. .................. 369/112.23; 369/44.23; 359/586
(58) Field of Search .................. 369/112.23, 103, 369/106, 112.07, 112.21, 44.12, 44.16, 44.23, 53.34, 47.28, 47.35, 284, 288; 359/793, 369, 719, 721, 722, 724, 738, 586, 581, 359, 580, 588, 589; 206/558, 486, 499, 562, 143, 161; 428/426, 625, 688, 689, 702, 218

(56) References Cited

U.S. PATENT DOCUMENTS

| | | | | |
|---|---|---|---|---|
| 4,497,539 A | * | 2/1985 | Sakurai et al. ............ | 359/586 |
| 4,726,654 A | * | 2/1988 | Kimura et al. ............ | 359/588 |
| 5,881,043 A | * | 3/1999 | Hasegawa et al. ......... | 369/106 |
| 5,885,712 A | * | 3/1999 | Otani et al. ............... | 428/426 |
| 5,920,431 A | * | 7/1999 | Tokuhiro et al. .......... | 359/586 |
| 5,963,365 A | * | 10/1999 | Shirai ....................... | 359/359 |
| 6,030,717 A | * | 2/2000 | Nakamura et al. ........ | 428/699 |
| 6,240,056 B1 | * | 5/2001 | Tanase et al. ............ | 369/47.28 |
| 6,243,203 B1 | * | 6/2001 | Schleipen et al. ......... | 359/581 |
| 6,319,598 B1 | * | 11/2001 | Nakano et al. ........... | 428/218 |
| 6,388,822 B1 | * | 5/2002 | Kitamura et al. .......... | 359/793 |

* cited by examiner

Primary Examiner—William Korzuch
Assistant Examiner—Kim-Kwok Chu
(74) Attorney, Agent, or Firm—Finnegan, Henderson, Farabow, Garrett & Dunner, L.L.P.

(57) ABSTRACT

In an optical lens used for a passing light having the maximum intensity on a wavelength ($\lambda_T$) of 780±10 nm, an optical is made such that a reflection preventing coating is provided on both or at least one of a light-incident surface (S1) and a light-outgoing surface (S2) and the following conditional formula is satisfied: $R_2(\lambda_R) > R_1(\lambda_R)$, where $R_1(\lambda_R)$ and $R_2(\lambda_R)$ are a reflectance of said respective surfaces for light having a wavelength ($\lambda_R$) falling within a range from 500 to 700 nm.

7 Claims, 8 Drawing Sheets

S1

S2

S1

S2

OPTICAL COMPONENT

BACKGROUND OF THE INVENTION

This invention relates to an optical lens for use in an optical head for reading an optical disk, and in particular, to a lens coating in relation to a high-precision mounting of an optical lens to an optical head with a use of a reflected light of a laser beam from a lens.

In a conventional optical lens for use in an optical head for reading an optical disk, a reflection preventing coating (hereinafter referred to also as a coat) is provided at each of a light-incident surface into which light comes and a light-outgoing surface from which the incident light is emitted and a laser beam of 780 nm is used as a passing light for the lens. Further, the optical characteristic of the reflection preventing coat provided on each of the light-incident surface (S1) and the light-outgoing surface (S2) of an optical lens is such one as shown in FIG. 1.

FIG. 1 is a drawing for explaining a conventional example of a coat (reflection preventing coat); FIG. 1(a) is an illustration of the layer structure of the coat on the surface S1 and the surface S2, and FIG. 1(b) is a drawing showing the reflectance (spectral reflectance) vs. the wavelength of light.

Moreover, the reflectance R (%) on the ordinate in FIG. 1 and in FIG. 2 to FIG. 7 which are described below is represented in logarithmic scale for the convenience of preparing the drawings. (Only in the last FIG. 8, the ordinate is represented with divisions of equal intervals.)

The layer structure of the reflection preventing coat of the light-incident surface (S1) and the light-outgoing surface (S2) (for light having a wavelength of 780 nm) is made such one as stated below. Further, for a substrate material, a resin material such as an acrylic resin, "Arton" resin, "Zeonex" resin, or a polycarbonate resin is used.

First layer: cerium oxide (refractive index n≠2.03) layer thickness d≠34 nm

Second layer: silicon oxide (refractive index n≠1.45) layer thickness d≠177 nm

With respect to the position adjustment in mounting an optical lens to an optical reading head, a lens which has been coated with reflection preventing coats is fitted in an optical reading head, and a He—Ne laser beam having a wavelength of 633 nm is irradiated through this lens, and the position adjustment is done by utilizing the reflected light.

However, as shown in FIG. 1, the reflectance for the wavelength 633 nm of a He—Ne laser beam is as low as 4.3%, and there has been the problem that a high precision can not be obtained in the position adjustment of the lens.

SUMMARY OF THE INVENTION

This invention has been made in order to solve the above-mentioned problem. That is, it is an object of the invention to provide means for improving the precision of the position adjustment of the lens, by preventing the lowering of the intensity of transmitting light having the wavelength $(\lambda_T)$ and by raising the reflectance of the surface S2 for the wavelength $(\lambda_R)$ of the light for the position adjustment.

The object of this invention can be accomplished by employing any one of the structures described below.

That is, in an optical lens to be used for a passing light having the maximum intensity at the wavelength $(\lambda_T)$ 780±10 nm, an optical component is made such that both or at least one of a light-incident surface (S1) and a light-outgoing surface (S2) is provided with a reflection preventing coating and the following inequality is satisfied:

$$R_2(\lambda_R) > R_1(\lambda_R),$$

where $R_1(\lambda_R)$ and $R_2(\lambda_R)$ denote the reflectance of the respective surfaces for a light having a wavelength $(\lambda_R)$ falling within a range from 500 to 700 nm.

Further, in an optical lens to be used for a passing light having the maximum intensity at a wavelength $(\lambda_T)$ falling within a range from 600 to 700 nm, an optical component is made such that both or at least one of the light-incident surface (S1) and the light-outgoing surface (S2) is provided with a reflection preventing coating, and the following inequality is satisfied:

$$R_2(\lambda_R) > R_1(\lambda_R),$$

where $R_1(\lambda_R)$ and $R_2(\lambda_R)$ denote the reflectance of the respective surfaces for a light having a wavelength $(\lambda_R)$ falling within a range from 750 to 850 nm.

Further, in an optical lens to be used for a passing light having the maximum intensity at a wavelength falling within a range from 350 to 500 nm, an optical component is made such that both or at least one of the light-incident surface (S1) and the light-outgoing surface (S2) is provided with a reflection preventing coating, and the following inequality is satisfied:

$$R_2(\lambda_R) > R_1(\lambda_R),$$

where $R_1(\lambda_R)$ and $R_2(\lambda_R)$ denote the reflectance of the respective surfaces for a light having a wavelength $(\lambda_R)$ within a range from 500 to 800 nm.

Further, the reflectance $R_2(\lambda_R)$ of the light-outgoing surface (S2) of the optical component is made not smaller than 5% for the wavelength $(\lambda_R)$.

For example, these are as follows.

(1) When the transmittance $T(\lambda_T)$ for a laser beam having a peak intensity at the wavelength $(\lambda_T)$ 780 nm is made 96% or more and the wavelength $(\lambda_R)$ falls within a range from 500 to 700 nm, desirably is the wavelength of 633 nm of a He—Ne laser beam, the following conditional formula is satisfied:

$$R_1(\lambda_R) < R_2(\lambda_R),$$

where $R_1(\lambda_R)$ and $R_2(\lambda_R)$ denote the reflectance of the light-incident surface and the light-outgoing surface respectively.

(2) When a lens is fitted in a pickup for an optical disk player, light is irradiated to the surface S2 of the lens and the position adjustment in the fitting is done by detecting the reflected light. Assuming that the wavelength of the reflected light is $\lambda_R$, the yield of assembly in the fitting greatly depend upon the reflectance $R_2(\lambda_R)$ of the surface S2 for light having the wavelength $\lambda_R$. In the case where $R_2(\lambda_R) \geq 5\%$, the yield of 88% or more can be obtained, and in the case where $R_2(\lambda_R) \geq 7\%$, the yield of 95% or more can be obtained. In order to make the expense of assembly smaller as far as possible, it is necessary to raise the yield as much as possible; it is required at least that $R_2(\lambda_R) \geq 5\%$, and it is desirably required that $R_2(\lambda_R) \geq 7\%$. This invention is capable of solving these requirements.

DETAILED DESCRIPTION OF THE PREFERRED EMBODIMENT

In the following, examples of practice will be shown.

Embodiment 1

Figure 1:
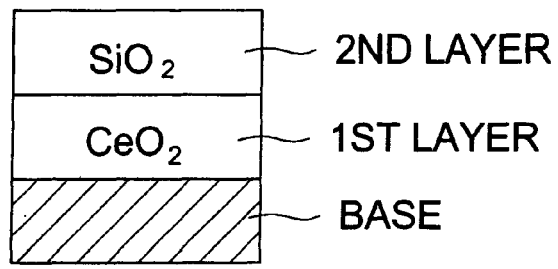
FIG. 1(a) and FIG. 1(b) are drawings for explaining an example of a conventional coat.
Figure 1:
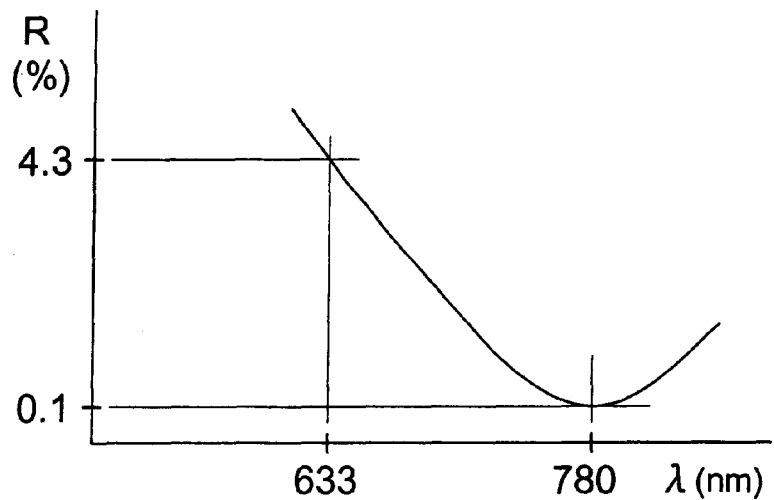
Figure 2:
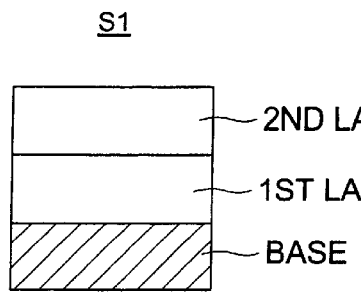
FIG. 2(*a*), FIG. 2(*b*), FIG. 2(*c*), and FIG. 2(*d*) are drawings for explaining the coat of Embodiment 1.
Figure 2:
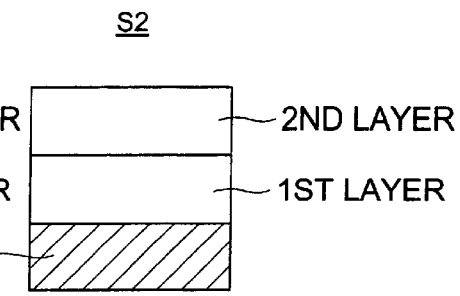
Figure 2:
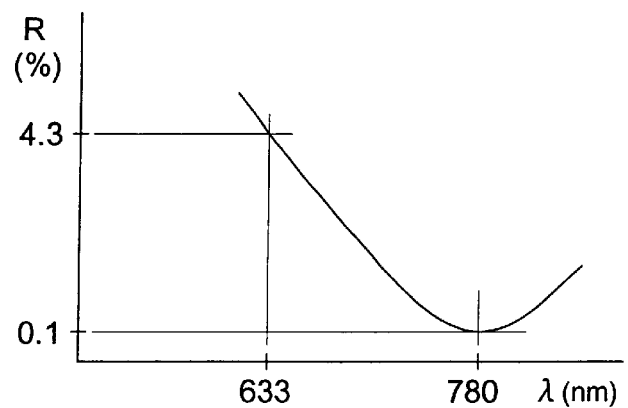
Figure 2:
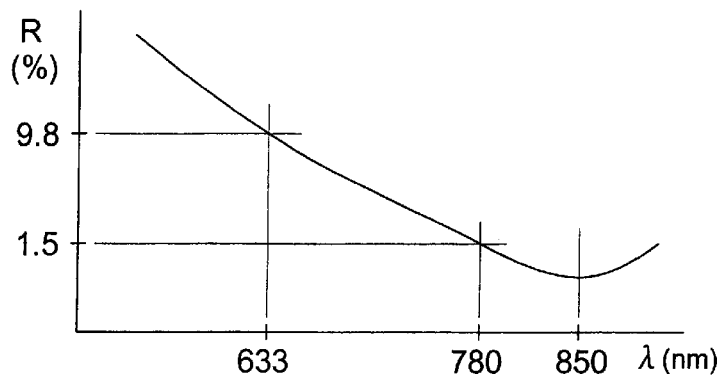

FIG. 2 are drawings for explaining the coat of Embodiment 1; FIG. 2(*a*) is an illustration of the structure of the coat layer of the surface S1, FIG. 2(*b*) is an illustration of the structure of the coat layer of the surface S2, FIG. 2(*c*) is a drawing showing a typical reflectance of the surface S1 vs. light wavelength, and FIG. 2(*d*) is a drawing showing a typical reflectance of the surface S2 vs. light wavelength.

For the base material in Embodiment 1, any one out of an acrylic resin, "Arton" resin, "Zeonex" resin, and a polycarbonate resin is used.

Reflection preventing coat of the surface S1

(herer, $n_{ij}$: the refractive index of the j-th layer of the surface $S_i$, $d_{ij}$: the layer thickness (mm) of the j-th layer of the surface $S_i$, i: 1 or 2, j: an integer)

First layer: cerium oxide (refractive index $n_{11}$≠2.03) layer thickness $d_{11}$=340 Å±30 Å

Second layer: silicon oxide (refractive index $n_{12}$≠1.45) layer thickness $d_{12}$=1770 Å±150 Å

Reflection preventing coat of the surface S2

First layer: cerium oxide (refractive index $n_{21}$≠2.03) layer thickness $d_{21}$=395 Å±15 Å

Second layer: silicon oxide (refractive index $n_{22}$≠1.45) layer thickness $d_{22}$=2075 Å±75 Å

In the vacuum deposition method, heating by an electronic gun is employed. For the evaporation source, a pellet of cerium oxide or particles of silicon oxide are placed. Oxide gas is introduced with its pressure made to be $1.5 \times 10^{-2}$ pas to carry out the vacuum deposition.

Effect

In this way, the following result was obtained.

As shown in FIG. 2(*c*) and FIG. 2(*d*), for the reflectance of 4.3% of the surface S1 for the wavelength 633 nm of the laser beam for the position adjustment, the reflectance of the surface S2 was 9.8%, which is larger than the conventional one, thereby making it possible to improve the precision of the position adjustment. Further, the transmittance for the passing laser beam having the wavelength of 780 nm was kept at 96% or more.

The summary of the results is as follows:

Transmittance $T(\lambda_T) \geq 96\%$ ($\lambda_T$: wavelength of a laser beam having the maximum intensity at 780 nm)

$R_1(\lambda_R)$=1.5% to 7.0%

($\lambda_R$: wavelength of a light having the maximum intensity at 633 nm (He—Ne laser beam))

$R_2(\lambda_R)$=9.7% to 13.0%

($\lambda_R$: the same as the above).

In this way, as the transmittance for the passing laser beam for use in an optical head having the above-mentioned wavelength, 96% or more could be secured. Further, the reflectance $R_2(\lambda_R)$ of the light-outgoing surface of the lens (S2) for the laser beam for the position adjustment of the lens was 9.7% to 13.0%, which is larger than 4.3% of the conventional example; thus, it has become possible that a reflectance of at least 5% or more is secured and the reflectance $R_2(\lambda_R)$ is made larger than the reflectance $R_1(\lambda_R)$ of the light-incident surface of the lens (S1) which is 1.5% to 7.0%, thereby improving the precision and the easiness of operation of the position adjustment of the lens as will be explained later in Embodiment 7.

Embodiment 2

Figure 3:
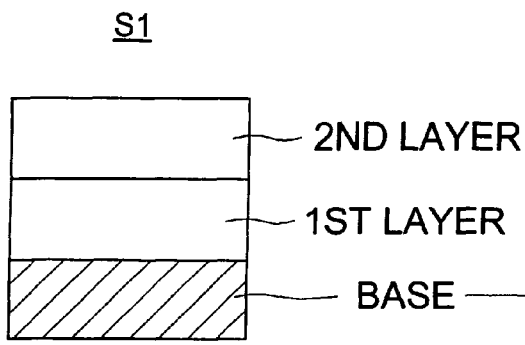
FIG. 3(*a*), FIG. 3(*b*), and FIG. 3(*c*) are drawings for explaining the coat of Embodiment 2.
Figure 3:
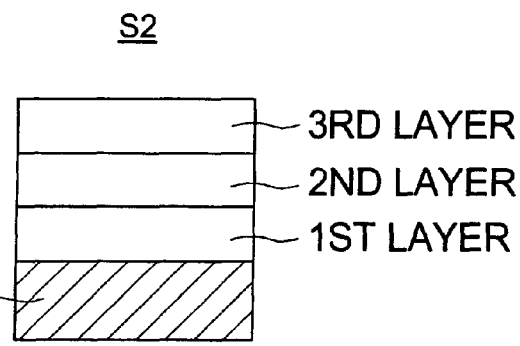
Figure 3:
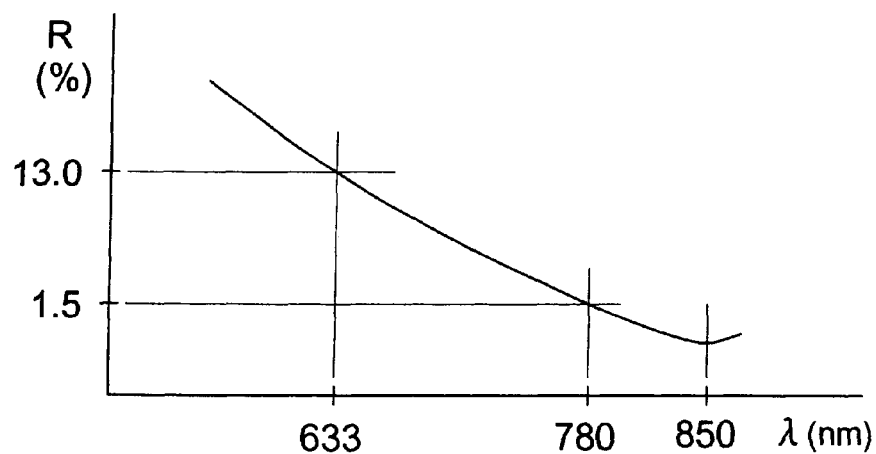

FIG. 3 are drawings for explaining the coat of Embodiment 2; FIG. 3(*a*) is an illustration of the structure of the coat layer of the surface S1, FIG. 3(*b*) is an illustration of the structure of the coat layer of the surface S2, and FIG. 3(*c*) is a drawing showing a typical reflectance of the surface S2 vs. light wavelength.

The base material of Embodiment 2 is the same as Embodiment 1.

Further, for the coat of the surface S1, the same one as Embodiment 1 is used.

Reflection preventing coat of the surface S2

First layer: silicon oxide (refractive index $n_{21}$≠1.45) layer thickness $d_{21}$=1480 Å±80 Å

Second layer: cerium oxide (refractive index $n_{22}$≠2.03) layer thickness $d_{22}$=530 Å±30 Å

Third layer: silicon oxide (refractive index $n_{23}$≠1.45) layer thickness $d_{23}$=1840 Å±90 Å

The method of vapor deposition is the same as Embodiment 1.

Effect

In this way, the following result was obtained.

As shown in FIG. 3, by making up the coat of the surface S2 of three layers, the reflectance of the surface S2 for the wavelength 633 nm of the laser beam for the position adjustment became higher to 13%.

Further, it was accomplished to make the transmittance T(780 nm) 96% or more, which is practically of no problem, and the precision of the position adjustment was improved more than Embodiment 1.

The summary of the results is as follows:

Transmittance $T(\lambda_T) \geq 96\%$ ($\lambda_T$: wavelength of a laser beam having the maximum intensity at 780 nm)

$R_2(\lambda_R)$=9.0% to 16.0%

($\lambda_R$: wavelength of a laser beam having the maximum intensity at 633 nm).

In this way, as the transmittance of the optical head for the passing laser beam for use as an optical head having the above-mentioned wavelength, 96% or more could be secured. Further, the reflectance $R_2(\lambda_R)$ of the light-outgoing surface (S2) of the lens for the laser beam for the position adjustment of the lens was 9.0% to 16.0%, which is larger than 4.3% of the conventional example; thus, it has become possible that a reflectance of at least 5% or more is secured and the reflectance $R_2(\lambda_R)$ is made larger than Embodiment 1, thereby improving the precision and the easiness of operation of the position adjustment of the lens as will be explained later in Embodiment 7.

Embodiment 3

Figure 4:
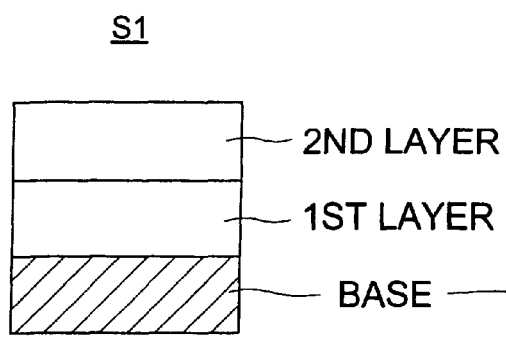
FIG. 4(*a*), FIG. 4(*b*), and FIG. 4(*c*) are drawings for explaining the coat of Embodiment 3.
Figure 4:
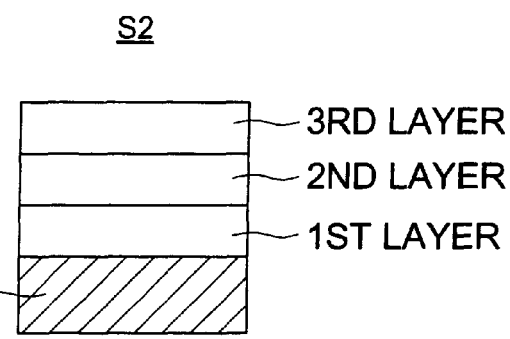
Figure 4:
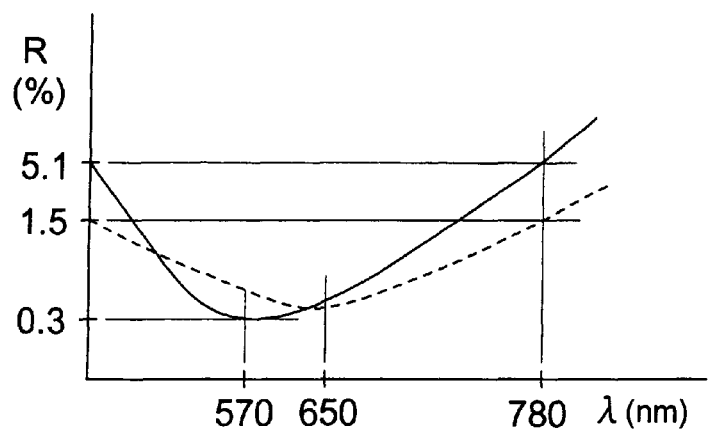

FIG. 4 are drawings for explaining the coat of Embodiment 3; FIG. 4(*a*) is an illustration of the structure of the coat layer of the surface S1, FIG. 4(b) is an illustration of the structure of the coat layer of the surface S2, and the broken line and the solid line in FIG. 4(c) are curves showing a typical reflectance of the surface S1 and S2 vs. light wavelength respectively.

The base material of Embodiment 3 is the same as Embodiment 1.

Reflection preventing coat of the surface S1

First layer: cerium oxide (refractive index $n_{11} \neq 2.03$) layer thickness $d_{11}$=283 Å±28 Å

Second layer: silicon oxide (refractive index $n_{12} \neq 1.45$) layer thickness $d_{12}$=1470 Å±150 Å

Reflection preventing coat of the surface S2

First layer: silicon oxide (refractive index $n_{21} \neq 1.45$) layer thickness $d_{21}$=920 Å±70 Å

Second layer: cerium oxide (refractive index $n_{22} \neq 2.03$) layer thickness $d_{22}$=328 Å±28 Å

Third layer: silicon oxide (refractive index $n_{23} \neq 1.45$) layer thickness $d_{23}$=1140 Å±90 Å

The method of vapor deposition is the same as Embodiment 1.

Effect

In this way, the following result was obtained:

Transmittance $T(\lambda_T) \geq 96\%$ ($\lambda_T$: wavelength of a laser beam having the maximum intensity at 650 nm)

$R_1(\lambda_R)$=0.5% to 2.8%

($\lambda_R$: wavelength of a laser beam having the maximum intensity at 780 nm)

$R_2(\lambda_R)$=5.1% to 6.8%

($\lambda_R$: the same as the above).

In this way, as the transmittance of the optical head for the passing laser beam for use as an optical head having the above-mentioned wavelength, 96% or more could be secured. Further, the reflectance $R_2(\lambda_R)$ of the light-outgoing surface (S2) of the lens for the laser beam for the position adjustment of the lens was 5.1% to 6.8%; thus, it has become possible that a reflectance of at least 5% or more is secured and the reflectance $R_2(\lambda_R)$ is made larger than the reflectance $R_1(\lambda_R)$ of the light-incident surface (S1) of the lens which is 0.5% to 2.8%, thereby improving the precision and the easiness of the position adjustment of the lens as will be explained later in Embodiment 7.

Embodiment 4

Figure 5:
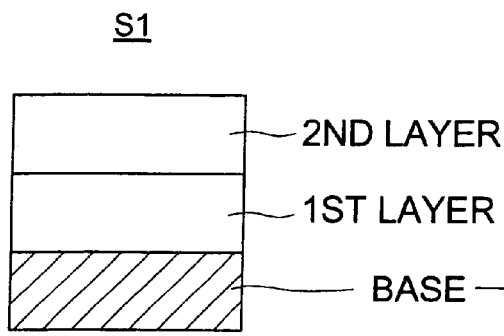
FIG. 5(*a*), FIG. 5(*b*), and FIG. 5(*c*) are drawings for explaining the coat of Embodiment 4.
Figure 5:
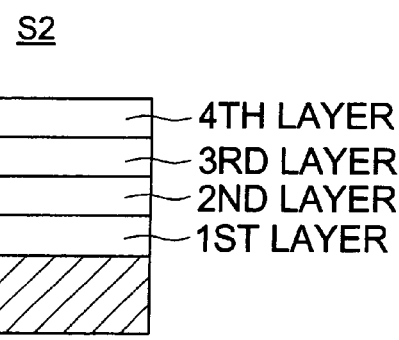
Figure 5:
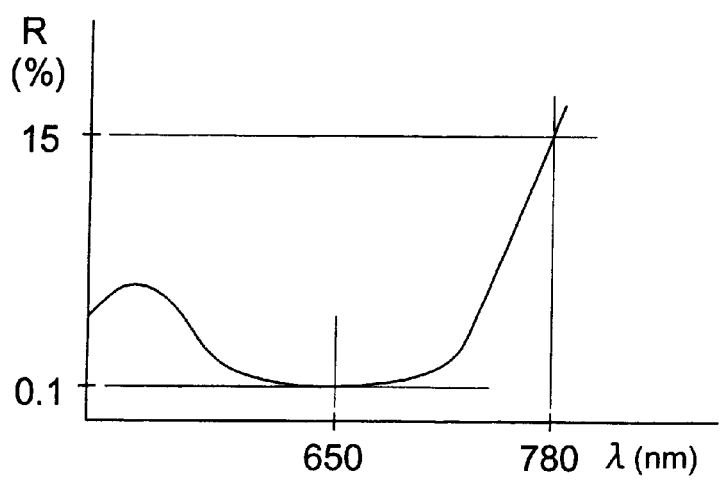

FIG. 5 are drawings for explaining the coat of Embodiment 4; FIG. 5(a) is an illustration of the structure of the coat layer of the surface S1, FIG. 5(b) is an illustration of the structure of the coat layer of the surface S2, and FIG. 5(c) is a drawing showing a typical reflectance of the surface S2 vs. light wavelength.

The base material of Embodiment 4 is the same as Embodiment 1.

Reflection preventing coat of the surface S1

First layer: cerium oxide (refractive index $n_{11} \neq 2.03$) layer thickness $d_{11}$=283 Å±28 Å

Second layer: silicon oxide (refractive index $n_{12} \neq 1.45$) layer thickness $d_{12}$=1470 Å±150 Å

(the reflection preventing coat of the surface S1 is the same as Embodiment 3)

Reflection preventing coat of the surface S2

First layer: cerium oxide (refractive index $n_{21} \neq 2.03$) layer thickness $d_{21}$=1370 Å±95 Å

Second layer: silicon oxide (refractive index $n_{22} \neq 1.45$) layer thickness $d_{22}$=1490 Å±104 Å

Third layer: cerium oxide (refractive index $n_{23} \neq 2.03$) layer thickness $d_{23}$=1010 Å±70 Å

Fourth layer: silicon oxide (refractive index $n_{24} \neq 1.45$) layer thickness $d_{24}$=834 Å±58 Å

The method of vapor deposition is the same as Embodiment 1.

Effect

In this way, the following result was obtained:

Transmittance $T(\lambda_T) \geq 96\%$ ($\lambda_T$: wavelength of a laser beam having the maximum intensity at 650 nm)

$R_1(\lambda_R)$=0.5% to 2.8%

($\lambda_R$: wavelength of a laser beam having the maximum intensity at 780 nm)

$R_2(\lambda_R)$=6.0% to 25.0%

($\lambda_R$: the same as the above).

In this way, as the transmittance of the optical head for the passing laser beam for use as an optical head having the above-mentioned wavelength, 96% or more could be secured. Further, the reflectance $R_2(\lambda_R)$ of the light-outgoing surface (S2) of the lens for the laser beam for the position adjustment of the lens was 6.0% to 25.0%, which is larger than 4.3% for the example of conventional one; thus, it has become possible that a reflectance of at least 5% or more is secured, the reflectance $R_2(\lambda_R)$ is made larger than the reflectance $R_1(\lambda_R)$ of the light-incident surface (S1) of the lens which is 0.5% to 2.8%, and it is made greatly higher than the example of the practice 3, thereby improving the precision and the easiness of operation of the position adjustment of the lens as will be explained later in Embodiment 7.

Embodiment 5

Figure 6:
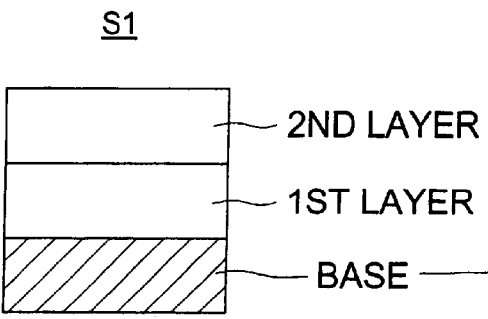
FIG. 6(*a*), FIG. 6(*b*), and FIG. 6(*c*) are drawings for explaining the coat of Embodiment 5.
Figure 6:
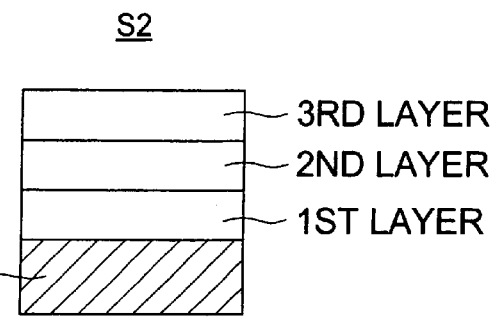
Figure 6:
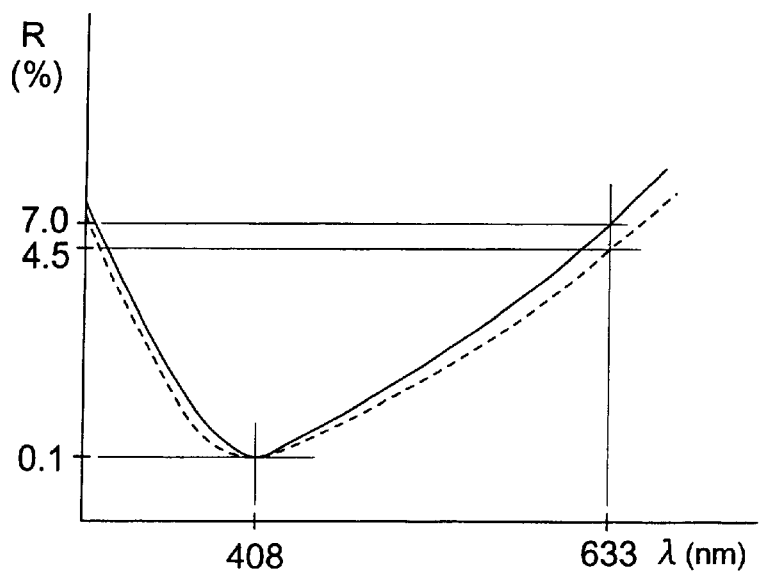

FIG. 6 are drawings for explaining the coat of Embodiment 5; FIG. 6(a) is an illustration of the structure of the coat layer of the surface S1, FIG. 6(b) is an illustration of the structure of the coat layer of the surface S2, and the broken line and the solid line in FIG. 6(c) are curves showing a typical reflectance of the surface S1 and S2 vs. light wavelength respectively.

The base material of Embodiment 5 is the same as Embodiment 1.

Reflection preventing coat of the surface S1

First layer: cerium oxide (refractive index $n_{11} \neq 2.03$) layer thickness $d_{11}$=174 Å±21 Å

Second layer: silicon oxide (refractive index $n_{12} \neq 1.45$) layer thickness $d_{12}$=898 Å±110 Å

Reflection preventing coat of the surface S2

First layer: silicon oxide (refractive index $n_{21} \neq 1.45$) layer thickness $d_{21}$=680 Å±65 Å

Second layer: cerium oxide (refractive index $n_{22} \neq 2.03$) layer thickness $d_{22}$=258 Å±25 Å

Third layer: silicon oxide (refractive index $n_{23} \neq 1.45$) layer thickness $d_{23}$=849 Å±84 Å

The method of vapor deposition is the same as Embodiment 1.

Effect

In this way, the following result was obtained:

Transmittance $T(\lambda_T) \geq 96\%$ ($\lambda_T$: wavelength of a laser beam having the maximum intensity at 408.3 nm)

$R_1(\lambda_R)$=4.0% to 5.5%

($\lambda_R$: wavelength of a laser beam having the maximum intensity at 633 nm)

$R_2(\lambda_R)$=6.0% to 7.5%

($\lambda_R$: the same as the above).

In this way, as the transmittance of the optical head for the passing laser beam for use as an optical head having the above-mentioned wavelength, 96% or more could be secured. Further, the reflectance $R_2(\lambda_R)$ of the light-outgoing surface (S2) of the lens for the laser beam for the position adjustment of the lens was 6.0% to 7.5%, which is larger than 5.0% for the example of conventional one; thus, it has become possible that the reflectance $R_2(\lambda_R)$ is made larger than the reflectance $R_1(\lambda_R)$ of the light-incident surface (S1) of the lens which is 4.0% to 5.5%, thereby improving the precision and the easiness of operation of the position adjustment of the lens as will be explained later in Embodiment 7.

Embodiment 6

Figure 7:
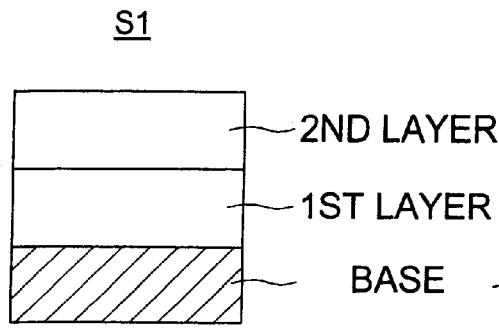
FIG. 7(*a*), FIG. 7(*b*), and FIG. 7(*c*) are drawings for explaining the coat of Embodiment 6.
Figure 7:
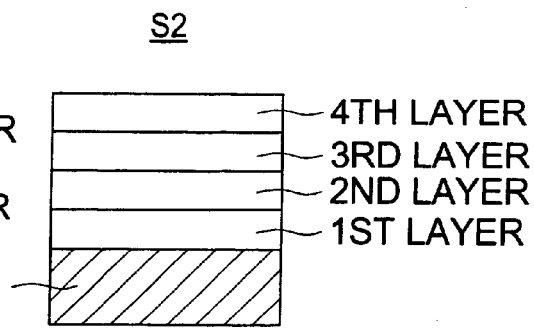
Figure 7:
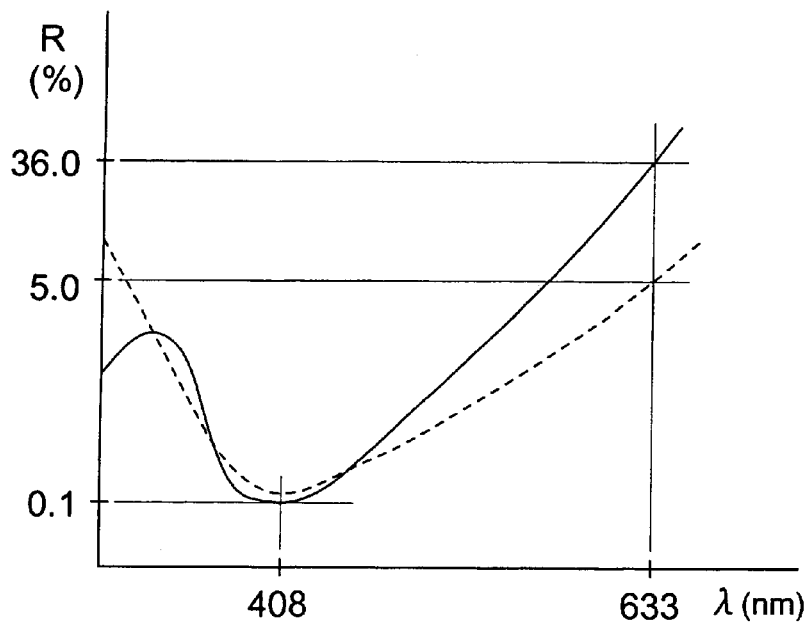

FIG. 7 are drawings for explaining the coat of Embodiment 6; FIG. 7(a) is an illustration of the structure of the coat layer of the surface S1, FIG. 7(b) is an illustration of the structure of the coat layer of the surface S2, and the broken line and the solid line in FIG. 7(c) are curves showing a typical reflectance of the surface S1 and S2 vs. light wavelength respectively.

The base material of Embodiment 6 is the same as Embodiment 1.

Reflection preventing coat of the surface S1

First layer: cerium oxide (refractive index $n_{11}$≠2.03) layer thickness $d_{11}$=174 Å±17 Å

Second layer: silicon oxide (refractive index $n_{12}$≠1.45) layer thickness $d_{12}$=898 Å±89 Å

Reflection preventing coat of the surface S2

First layer: zirconium oxide (refractive index $n_{21}$≠2.03) layer thickness $d_{21}$=910 Å±90 Å

Second layer: silicon oxide (refractive index $n_{22}$≠1.45) layer thickness $d_{22}$=982 Å±95 Å

Third layer: zirconium oxide (refractive index $n_{23}$≠2.03) layer thickness $d_{23}$=645 Å±64 Å

Fourth layer: silicon oxide (refractive index $n_{24}$≠1.45) layer thickness $d_{24}$=548 Å±54 Å

The method of vapor deposition is the same as Embodiment 1.

Effect

In this way, the following result was obtained:

Transmittance $T(\lambda_T) \geq 96\%$ ($\lambda_T$: wavelength of a laser beam having the maximum intensity at 408.3 nm)

$R_1(\lambda_R)$=4.0% to 5.5%

($\lambda_R$: wavelength of a laser beam having the maximum intensity at 633 nm)

$R_2(\lambda_R)$=30.0% to 36.5%

($\lambda_R$: the same as the above).

In this way, as the transmittance of the optical head for the passing laser beam for use as an optical head having the above-mentioned wavelength, 96% or more could be secured. Further, the reflectance $R_2(\lambda_R)$ of the light-outgoing surface (S2) of the lens for the laser beam for the position adjustment of the lens was 30.0% to 36.5%, which is larger than 4.3% for the example of conventional one; thus, it has become possible that the reflectance is made larger than the reflectance $R_1(\lambda_R)$ of the light-incident surface (S1) of the lens which is 4.0% to 5.5%, and it is made greatly higher than the example of the practice 5, thereby improving the precision and the easiness of operation of the position adjustment of the lens as will be explained later in Embodiment 7.

Embodiment 7

Figure 8:
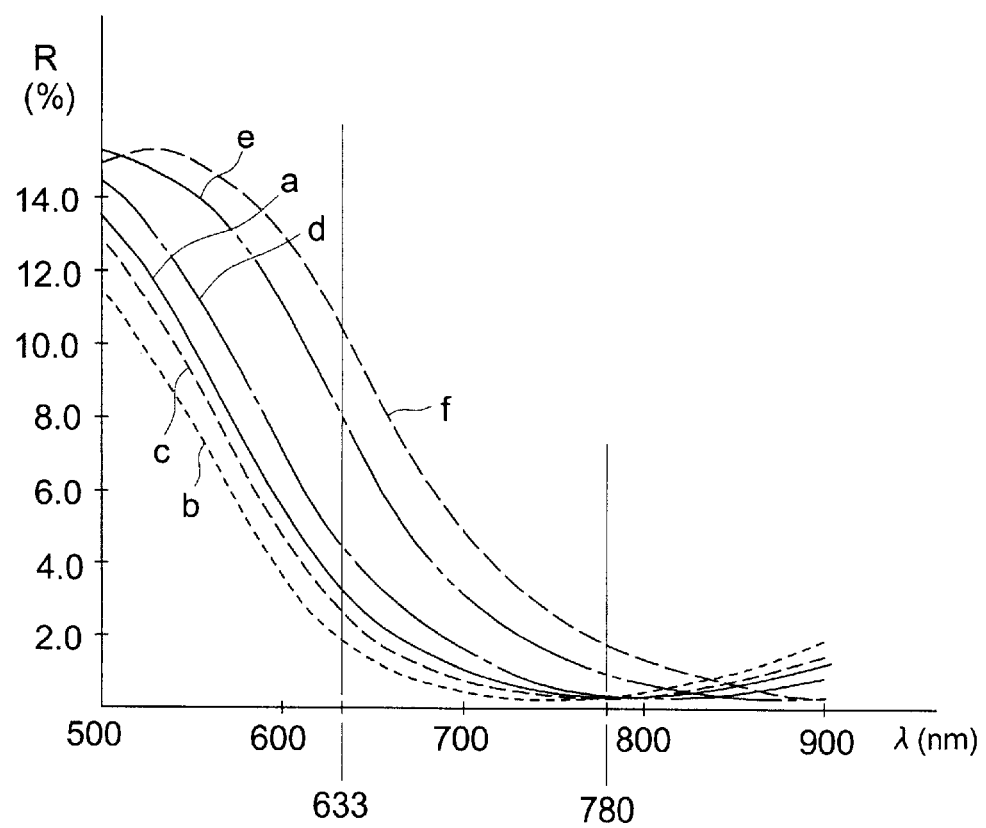
FIG. 8 is a drawing for explaining the coat of Embodiment 7.

FIG. 8 is a drawing for explaining the coat of Embodiment 7; it is a drawing showing curves of the reflectance of the surface S2 of a lens, of which the reflection preventing coat of the surface S1 and the surface S2 in Embodiment 1 is made up in such a manner as shown in Table 1 below, vs. wavelength of light.

In addition, the ordinate of this FIG. 8, the reflectance R(%) is represented in equal-interval scale, which is different from FIG. 1 to FIG. 7 as described in the above.

TABLE 1

| | | Reflection preventing coat of | Kind of reflection preventing coat of surface S2 | | | | |
|---|---|---|---|---|---|---|---|
| | | surface S1 | 1 | 2 | 3 | 4 | 5 |
| 1st layer cerium oxide | Coat No. (Å) | $d_{11}$ 340 | 318 | 326 | $d_{21}$ 344 | 357 | 387 |
| 2nd layer silicon oxide | Coat No. (Å) $\lambda_R$ | $d_{12}$ 1770 | 1656 | 1700 | $d_{22}$ 1793 790 | 1862 820 | 2023 |
| Reflectance in FIG. 8 | | a | b | c | d | e | f |

Further, in Table 2 described below, the reflectance, the transmittance, the yield in assembly, and the judgment whether it is good or bad for practical use are shown for the case where the reflection preventing coat of the surfaces S1 and S2 is formed in each of the combinations shown in the above-mentioned Table 1. Besides, the wavelength $\lambda_R$ of the laser beam for the position adjustment of the lens is 633 nm, and the wavelength $\lambda_T$ of the passing laser beam for use in an optical head is 780 nm.

TABLE 2

| | Kind of reflection preventing coat of surface S2 | | | | |
|---|---|---|---|---|---|
| | 1 | 2 | 3 | 4 | 5 |
| $R_1(\lambda_R)$ (%) | 4.3 | 4.3 | 4.3 | 4.3 | 4.3 |
| $R_2(\lambda_R)$ (%) | 2.3 | 3.0 | 5.0 | 7.0 | 11.0 |
| $T(\lambda_T)$ (%) | 97.8 | 98.0 | 98.2 | 97.2 | 96.8 |
| Yield (%) | 70 | 75 | 88 | 95 | 98 |
| Evaluation | C | C | B | A | A |

As shown in Table 2, when the reflectance $R_2(\lambda_R)$ of the kind 1 and the kind 2 of the reflection preventing coat of the surface S2 is 2.3% and 3.0% respectively which are smaller than the reflectance $R_1(\lambda_R)$ 4.3% of the surface S1, the assembly yield becomes 70% and 75% respectively, which do not make the practical quality come up to the standard, because the position adjustment using the reflected light by the surface S2 becomes hard to observe owing to insufficient illumination.

When the reflectance $R_2(\lambda_R)$ of the kind 3 of the coat of the surface S2 is 5.0% which is larger than the reflectance $R_1(\lambda_R)$ 4.3% of the surface S1, resulting in the assembly yield of 88%, the practical quality comes up to the standard, because the position adjustment using the reflected light by the surface S2 becomes easy to observe owing to sufficient illumination which improves the precision of position adjustment and the easiness of operation.

Further, when the reflectance $R_2(\lambda_R)$ of the kind 4 and kind 5 of the coat of the surface S2 are 7.0% and 11.0% respectively which are larger than the reflectance $R_1(\lambda_R)$ 4.3% of the surface S1, and when the value of the reflectance $R_2(\lambda_R)$ becomes larger 7.0% to 11.0%, the assembly yield becomes 95% to 98% which come near to almost 100% and the practical quality comes sufficiently up to the standard, because the position adjustment using the reflected light by the surface S2 becomes easy to observe owing to sufficient illumination which improves the precision of position adjustment and the easiness of operation. Accordingly, if the reflectance $R_2(\lambda_R)$ of the surface S2 is larger than the reflectance $R_1(\lambda_R)$ of the surface S1, and in particular, if the reflectance $R_2(\lambda_R)$ of the surface S2 is so large as to get a value described in the above, the assembly yield becomes nearly 100% owing to the improvement of the precision of the position adjustment and the easiness of operation as described in the above; that is very desirable.

According to this invention, it has become possible to provide means for preventing the lowering of the intensity of the transmitted light for the wavelength $(\lambda_T)$, for raising the reflectance of the surface S2 for the wavelength $(\lambda_R)$ of the light for the position adjustment, and for improving the precision of the position adjustment of the lens.

What is claimed is:

1. In an optical lens used for a passing light having the maximum intensity on a wavelength $(\lambda_T)$ of 780±10 nm, a reflection preventing coating is provided on both or at least one of a light-incident surface (S1) and a light-outgoing surface (S2) and the following conditional formula is satisfied:

$$R_2(\lambda_R) > R_1(\lambda_R),$$

where $R_1(\lambda_R)$ and $R_2(\lambda_R)$ are a reflectance of said respective surfaces for light having a wavelength $(\lambda_R)$ falling within a range from 500 to 700 nm.

2. In an optical lens used for a passing light having the maximum intensity on a wavelength $(\lambda_T)$ within a range of 600 to 700 nm, a reflection preventing coating is provided on both or at least one of a light-incident surface (S1) and a light-outgoing surface (S2) and the following inequality is satisfied:

$$R_2(\lambda_R) > R_1(\lambda_R),$$

where $R_1(\lambda_R)$ and $R_2(\lambda_R)$ are a reflectance of said respective surfaces for light having a wavelength $(\lambda_R)$ falling within a range from 750 to 850 nm.

3. In an optical lens used for a passing light having the maximum intensity on a wavelength $(\lambda_T)$ within a range of 350 to 500 nm, a reflection preventing coating is provided on both or at least one of a light-incident surface (S1) and a light-outgoing surface (S2) and the following inequality is satisfied:

$$R_2(\lambda_R) > R_1(\lambda_R),$$

where $R_1(\lambda_R)$ and $R_2(\lambda_R)$ are a reflectance of said respective surfaces for light having a wavelength $(\lambda_R)$ falling within a range from 500 to 800 nm.

4. The optical lens as set forth in any one of claims 1 to 3, wherein the reflectance $R_2(\lambda_R)$ of the light-outgoing surface (S2) for light having the wavelength $(\lambda_R)$ is made 5% or more.

5. An optical pickup device for conducting recording or reproducing an optical information recording medium, comprising:

a light source to emit light flux having a predetermined wavelength falling within a range of 780±10 nm; and a converging optical system having an optical lens, wherein said optical lens satisfies the following conditional formula:

$$R_2(\lambda_R) > R_1(\lambda_R),$$

Where $R_1(\lambda_R)$ is a reflectance of a light-incident surface of said optical lens for light flux having a wavelength $(\lambda_R)$ falling within a range from 500 to 700 nm, and $R_2(\lambda_R)$ is a reflectance of a light-outgoing surface of said optical lens for light flux having a wavelength $(\lambda_R)$ falling within a range from 500 to 700 nm.

6. An optical pickup device for conducting recording or reproducing an optical information recording medium, comprising:

a light source to emit light flux having a predetermined wavelength falling within a range of 600 to 700 nm; and a converging optical system having an optical lens, wherein said optical lens satisfies the following conditional formula:

$$R_2(\lambda_R) > R_1(\lambda_R),$$

Where $R_1(\lambda_R)$ is a reflectance of a light-incident surface of said optical lens for light flux having a wavelength $(\lambda_R)$ falling within a range from 750 to 800 nm, and $R_2(\lambda_R)$ is a reflectance of a light-outgoing surface of said optical lens for light flux having a wavelength $(\lambda_R)$ falling within a range from 750 to 800 nm.

7. An optical pickup device for conducting recording or reproducing an optical information recording medium, comprising:

a light source to emit light flux having a predetermined wavelength falling within a range of 350 to 500 nm; and a converging optical system having an optical lens, wherein said optical lens satisfies the following conditional formula:

$$R_2(\lambda_R) > R_1(\lambda_R),$$

Where $R_1(\lambda_R)$ is a reflectance of a light-incident surface of said optical lens for light flux having a wavelength $(\lambda_R)$ falling within a range from 500 to 800 nm, and $R_2(\lambda_R)$ is a reflectance of a light-outgoing surface of said optical lens for light flux having a wavelength $(\lambda_R)$ falling within a range from 500 to 800 nm.

* * * * *